Aug. 12, 1947. M. SHOLDER Re. 22,906

BLOUSE

Original Filed April 1, 1942

Inventor
Morris Sholder
By Williams, Bradbury & Hinkle
Attys.

Reissued Aug. 12, 1947 Re. 22,906

UNITED STATES PATENT OFFICE 22,906

BLOUSE

Morris Sholder, Chicago, Ill., assignor to Form Fashion, Inc., Chicago, Ill., a corporation of Illinois Original No. 2,390,188, dated December 4, 1945, Serial No. 437,171, April 1, 1942. Application for reissue September 7, 1946, Serial No. 695,348

8 Claims. (Cl. 2—125)

The present invention relates to garment sleeve construction of upper garments such as blouses, dresses, men's shirts, and the like, and is particularly concerned with the provision of a garment which will not ride up on the wearer's shoulders and which will stay tucked in at the waist when the arm is raised or swung forwardly or backwardly.

One of the problems met with in blouses and shirts to a greater extent than in longer garments is that blouses and shirts, being shorter and of less weight, do not have as great a tendency to stay in place, particularly when the arm is raised. Additionally, even though a dress may ride up somewhat when the arm is raised, it will return to its original position when the arm is lowered, while a blouse or shirt which rides up will pull out at least partially from where it is tucked in beneath the top of the skirt, shorts, slacks or other lower garment with which it is worn. Then when the arm is lowered, the blouse or shirt will not return to its original position, and when the arm is successively raised, the blouse or shirt is likely to be pulled farther and farther from beneath the waistband of the anchoring garment, until finally the wearer must tuck it back into place beneath the waistband.

It is one of the objects of the present invention to provide an improved sleeve construction such that the upper garment will not pull out from beneath the waistband of an anchoring garment.

An additional object is to provide an upper garment of novel construction.

Still another object is to provide a novel upper garment having the beforementioned features which is neat in appearance and which requires no gussets or other inset pieces at the point where the arm portion joins the front and back panels.

Yet another object is to provide a novel upper garment having the above features and which, in addition, appears on casual inspection to be cut in a conventional manner.

Still another object is to provide a novel pattern or fabric blank for a sleeve.

Other objects and advantages will become apparent from the following description of a preferred embodiment of my invention illustrated in the accompanying drawing in which similar characters of reference refer to similar parts throughout the several views.

The blouse shown in the figures is comprised of a pair of front panels 10, joined at their side edges to a back panel 12, these three panels being preferably connected at the top by a shoulder yoke 14. The panels 10 and 12 are straight cut in the conventional manner, but the arm holes provided in this garment are considerably deeper than is usual, as may be seen in Fig. 1.

Figure 1:
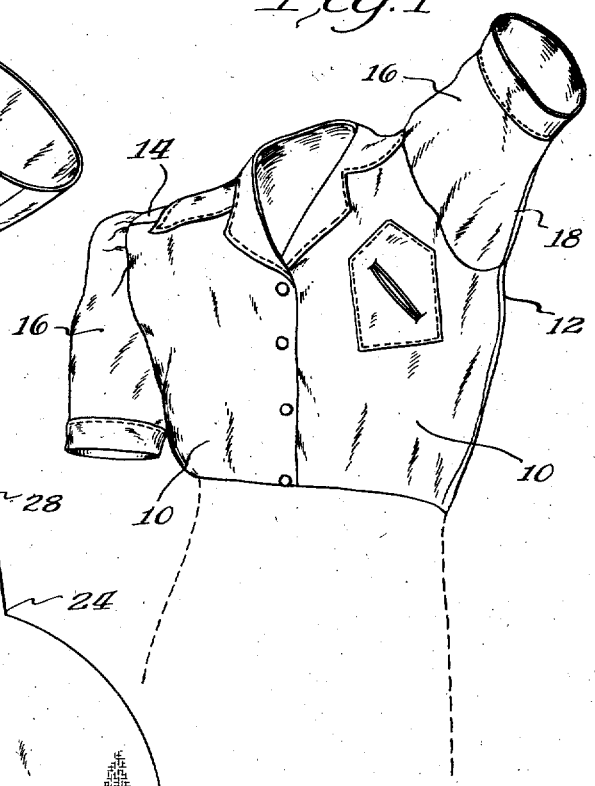
Fig. 1 is a front perspective view of a blouse embodying the present invention shown with one of the sleeves raised.

The sleeve proper indicated by the numeral 16 is straight cut in the same manner as the front and back panels and, as may be seen in Fig. 1, each of the sleeves is stitched directly to the front and back panels around the entire circumference of the arm opening, with the underarm seam of the sleeve indicated by the numeral 18 in alignment with the side seam of the garment which joins the front and back panels.

Figure 2:
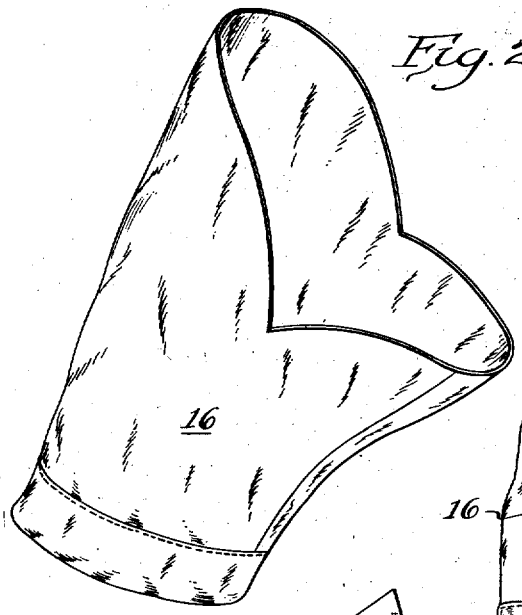
Fig. 2 is a perspective view of the righthand blouse sleeve shown detached from the body portion of the garment.

Around the upper portion of the armhole opening, the sleeve is considerably gathered when stitched thereto to provide considerable fullness at the shoulder and preferably padding (not shown) supports this shoulder portion of the garment sleeve. As shown in Fig. 2, the upper portion of the circumference of the upper end of the sleeve is substantially an arc of a true circle, while the lower portion is cut so as to project nearly directly inwardly a considerable distance, in fact the lower portion is nearly the reverse complement of the upper portion. Thus, when the upper half of the circumference of the upper portion of the sleeve is stitched to the garment sleeve opening which is substantially vertical, the lower portion tends to project directly inwardly unless the sleeve is raised substantially into the position shown in Fig. 1.

With this arrangement, when the sleeve is in raised position, ample fullness is provided at the lower portion of the sleeve so that there is no tendency for the side of the blouse to be pulled upwardly.

In other words, as the arm is raised and lowered, the sleeve tends to pivot about an intermediate point approximately half-way up the garment sleeve opening. Thus, the underarm portion of the sleeve will straighten out, while the gathering over the shoulder will tend to absorb the additional fullness caused at the shoulder covering portion of the sleeve when the arm is raised, while when the arm is lowered, the additional fullness in the sleeve beneath the arm will be covered and therefore will be unnoticeable.

Figure 3:
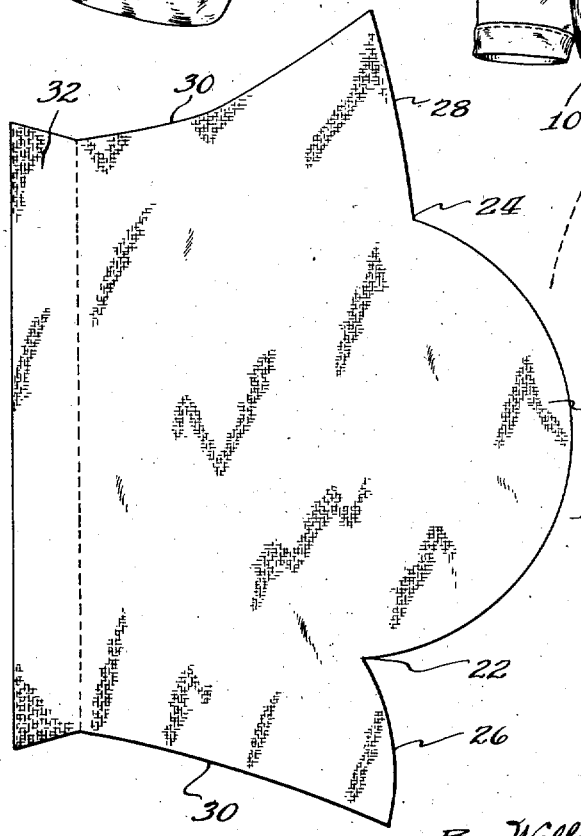
Fig. 3 is a plan view of a pattern or sleeve blank for the sleeve shown in Fig. 2.

The pattern from which the sleeve shown in Fig. 2 is cut is shown in Fig. 3. Fig. 3 may also be considered as the fabric blank from which the sleeve is made. As there shown, the upper portion of the sleeve which overlies the shoulder and which on the pattern is indicated by the numeral 20, is substantially semi-circular, although it should be noticed that at the side of the sleeve which is to be at the front of the garment, the arcuate portion 20 extends downwardly somewhat further than it does at the side of the sleeve which will be stitched to the back panel. The former of these two points is indicated by the numeral 22, while the end of the arcuate portion at the back is indicated by the numeral 24; and it will be seen that the point 22 is closer to the cuff 32 than is the point 24, so that the arcuate portion may be said to be inclined slightly toward the front of the sleeve or garment.

From the point 22 the remaining edge portion 26 of the sleeve, which is stitched to the garment, sweeps through an arc outwardly and upwardly (when viewed from the left of Figure 3), while the similar edge portion 28 of the sleeve which is secured to the back panel sweeps outwardly and downwardly. Further, it should be noted that the outwardly swept portion in front indicated by the numeral 26 is somewhat shorter than the similar portion 28 which is secured to the back panel.

From the ends of the outwardly swept portions 26 and 28, the sleeve is cut downwardly and inwardly, both at the front and back, and these edges of the sleeve, which are indicated by the numeral 30, are stitched together to form the underarm seam of the sleeve. At the lower end of the sleeve, a portion 32, set off by a dotted line, is folded over and stitched down to form the sleeve cuff.

With the blouse thus constructed I have found that the action of the sleeve is extremely free, both when the arm is raised and lowered, and also when swung forwardly and backwardly. The sleeve also hangs well without bunching beneath the arm and, because the sleeve is free to move both upwardly and downwardly, there is no tendency for the portion of the sleeve overlying the shoulder to bunch or ride up on the shoulder. It will be seen further that the invention accomplishes all of the objectives set out for it in an earlier portion of the specification.

Moreover, it will be understood that the action and advantages of the sleeve construction described in connection with one use thereof, a ladies' blouse, apply equally to other upper garments having sleeves, as men's shirts, whether of the standard or sport type, dresses, particularly of the type where they are held fairly tightly at the waist, and the like. The sleeve construction is applicable to any garment where it is desired to prevent the side of the garment from riding up when the arm is lifted, whether the garment be a woman's blouse either with or without tucks or shirring, a conventional man's shirt, a man's sport shirt, or any upper garment having sleeves.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A garment comprising front and back panels stitched together to provide a deep, regularly curved armhole opening generally in one plane, and a sleeve formed from a piece of fabric having at one end a substantially semi-circular portion extending outwardly and a pair of generally triangular wing portions projecting outwardly at each side of the semi-circular portion and each having an edge extending generally radially of the semi-circular portion, each of said edges being adapted to be attached to a lower portion of the armhole, the shaping and arrangement being such that when the other edges of the wing portions are stitched together the piece provides an upper sleeve portion with a curved edge generally in one plane adapted to match the upper portion of the armhole and a lower sleeve portion with a generally curved edge generally in another plane normally at a decided angle to the plane of the upper sleeve portion edge and distorted out of its normal plane for attachment to the lower portion of the armhole, both said sleeve portions being stitched directly to said armhole opening.

2. A garment comprising front and back panels stitched together to provide a deep, regularly curved armhole opening generally in one plane, and a sleeve formed from a piece of fabric having at one end a substantially semi-circular portion extending outwardly and a pair of generally triangular wing portions projecting outwardly at each side of the semi-circular portion and each having a curved edge of a length of the same order as the radius of the semi-circular portion and extending generally radially therefrom, each of said edges being adapted to be attached to a lower portion of the armhole, the shaping and arrangement being such that when the other edges of the wing portions are stitched together the piece provides an upper sleeve portion with a curved edge generally in one plane stitched directly to the upper portion of the armhole and a lower sleeve portion with a generally curved edge generally in another plane normally at a decided angle to the plane of the upper sleeve portion edge and distorted out of its normal plane and stitched directly to the lower portion of the armhole.

3. A garment sleeve blank comprising a piece of fabric cut to provide a sleeve designed to be stitched directly to a regularly curved armhole of a garment, having at one end a substantially semi-circular portion extending outwardly therefrom and inclined slightly toward the front of the sleeve, and a pair of generally triangular wing portions projecting outwardly at each side of the semi-circular piece, each such wing portion having a generally curved edge projecting approximately radially from the semi-circular portion and designed to be stitched directly to said armhole without folding of such wing portion, the edge intended to lie to the back of the sleeve making an obtuse angle with the semi-circular portion and being longer than the edge intended to lie to the front of the sleeve, this latter edge making a sharper angle with the semi-circular portion, the other edges of each of the wing portions being adapted to be stitched together to form a sleeve having an upper portion with a curved edge generally in one plane and a lower sleeve portion with a generally curved edge generally in another plane at a decided angle to the plane of the upper sleeve portion edge.

4. A garment comprising front and back panels stitched together to provide a deep, regularly curved armhole opening generally in one plane, and a sleeve formed from a piece of fabric having at one end an arcuate portion extending outwardly and a pair of generally triangular wing portions projecting outwardly at each side of the arcuate portion and each having an edge extending from an end of the arcuate portion, each of said edges being adapted to be attached to a lower portion of the arm hole, the shaping and arrangement being such that when the other edges of the wing portions are stitched together the piece provides an upper sleeve portion with a curved edge generally in one plane adapted to match the upper portion of the armhole and a lower sleeve portion with a generally curved edge generally in another plane normally at a decided angle to the plane of the upper sleeve portion edge and distorted out of its normal plane for attachment to the lower portion of the armhole, both said sleeve portions being stitched directly to said armhole opening.

5. A garment comprising front and back panels stitched togther to provide a deep, regularly curved armhole opening generally in one plane, and a sleeve formed from a piece of fabric having at one end a central portion comprising a portion of a circle extending outwardly and a pair of generally triangular wing portions projecting outwardly at each side of the central portion and each having an edge extending from an end of the central portion, each of said edges being adapted to be attached to a lower portion of the armhole, the shaping and arrangement being such that when the other edges of the wing portions are stitched together the piece provides an upper sleeve portion with a curved edge generally in one plane adapted to match the upper portion of the armhole and a lower sleeve portion with a generally curved edge generally in another plane normally at a decided angle to the plane of the upper sleeve portion edge and distorted out of its normal plane for attachment to the lower portion of the armhole, both said sleeve portions being stitched directly to said armhole opening.

6. A garment comprising front and back panels stitched together to provide a deep, regularly curved armhole opening generally in one plane, and a sleeve formed from a piece of fabric having at one end an arcuate portion extending outwardly therefrom and inclined slightly toward the front of the sleeve, and a pair of generally triangular wing portions projecting outwardly at each side of the arcuate portion, each such wing portion having an edge extending from an end of the arcuate portion and designed to be stitched directly to said armhole without folding of such wing portion, the edge intended to lie to the back of the sleeve making an obtuse angle with the arcuate portion and being longer than the edge intended to lie to the front of the sleeve, this latter edge making a sharper angle with the arcuate portion, the other edges of each of the wing portions being adapted to be stitched together to form a sleeve having an upper portion with a curved edge generally in one plane and a lower sleeve portion generally in another plane at a decided angle to the plane of the upper sleeve portion edge.

7. A garment sleeve blank comprising a piece of fabric cut to provide a sleeve designed to be stitched directly to a regularly curved armhole of a garment, having at one end an arcuate portion extending outwardly therefrom and inclined slightly toward the front of the sleeve, and a pair of generally triangular wing portions projecting outwardly at each side of the arcuate portion, each such wing portion having an edge extending from an end of the arcuate portion and designed to be stitched directly to said armhole without folding of such wing portion, the edge intended to lie to the back of the sleeve making an obtuse angle with the arcuate portion and being longer than the edge intended to lie to the front of the sleeve, this latter edge making a sharper angle with the arcuate portion, the other edges of each of the wing portions being adapted to be stitched together to form a sleeve having an upper portion with a curved edge generally in one plane and a lower sleeve portion edge generally in another plane at a decided angle to the plane of the upper sleeve portion edge.

8. A garment sleeve blank comprising a piece of fabric cut to provide a sleeve designed to be stitched directly to a regularly curved armhole of a garment, having at one end an arcuate portion extending outwardly therefrom, and a pair of generally triangular wing portions projecting outwardly at each side of the arcuate portion, each such wing portion having an edge extending from an end of the arcuate portion and designed to be stitched directly to said armhole without folding of such wing portion, the edge intended to lie to the back of the sleeve making an obtuse angle with the arcuate portion and being longer than the edge intended to lie to the front of the sleeve, this latter edge making a sharper angle with the arcuate portion, the other edges of each of the wing portions being adapted to be stitched together to form a sleeve having an upper portion with a curved edge generally in one plane and a lower sleeve portion edge generally in another plane at a decided angle to the plane of the upper sleeve portion edge.

MORRIS SHOLDER.

REFERENCES CITED

The following references are of record in the file of this patent:

UNITED STATES PATENTS

| Number | Name | Date |
|---|---|---|
| 2,127,366 | Mele | Aug. 16, 1938 |
| 2,320,605 | Jansson | June 1, 1943 |
| 1,986,217 | Pilla | Jan. 1, 1935 |